(12) United States Patent
Schwarz et al.

(10) Patent No.: US 11,567,633 B2
(45) Date of Patent: Jan. 31, 2023

(54) INTENTION IMAGE ANALYSIS FOR DETERMINING USER FOCUS

(71) Applicant: Microsoft Technology Licensing, LLC, Redmond, WA (US)

(72) Inventors: Julia Schwarz, Bellevue, WA (US); Andrew D. Wilson, Seattle, WA (US); Sophie Stellmach, Kirkland, WA (US); Erian Vazquez, Redmond, WA (US); Kristian Jose Davila, Redmond, WA (US); Adam Edwin Behringer, Seattle, WA (US); Jonathan Palmer, Bellevue, WA (US); Jason Michael Ray, Seattle, WA (US); Mathew Julian Lamb, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/170,696

(22) Filed: Feb. 8, 2021

(65) Prior Publication Data
US 2022/0253182 A1 Aug. 11, 2022

(51) Int. Cl.
*G06F 3/0482* (2013.01)
*G06F 3/01* (2006.01)
(Continued)

(52) U.S. Cl.
CPC ............ *G06F 3/0482* (2013.01); *G06F 3/013* (2013.01); *G06F 3/017* (2013.01);
(Continued)

(58) Field of Classification Search
CPC .... G06F 3/0482; G06F 3/017; G06F 3/04815; G06F 3/167; G06F 3/0346
(Continued)

(56) References Cited

U.S. PATENT DOCUMENTS

2011/0107192 A1* 5/2011 Ge ..................... A61K 31/12
715/202
2014/0361971 A1* 12/2014 Sala .................... G06F 3/013
345/156

(Continued)

OTHER PUBLICATIONS

Kaiser, et al., "Mutual Disambiguation of 3D Multimodal Interaction in Augmented and Virtual Reality", In Proceedings of the 5th International Conference on Multimodal Interfaces, Nov. 5, 2003, pp. 12-19.

(Continued)

*Primary Examiner* — Sherrod L Keaton
(74) *Attorney, Agent, or Firm* — Alleman Hall Creasman & Tuttle LLP

(57) ABSTRACT

A computer-implemented method for determining focus of a user is provided. User input is received. An intention image of a scene including a plurality of interactive objects is generated. The intention image includes pixels encoded with intention values determined based on the user input. An intention value indicates a likelihood that the user intends to focus on the pixel. An intention score is determined for each interactive object based on the intention values of pixels that correspond to the interactive object. An interactive object of the plurality of interactive objects is determined to be a focused object that has the user's focus based on the intention scores of the plurality of interactive objects.

18 Claims, 10 Drawing Sheets

(51) Int. Cl.
  *G06F 3/04815* (2022.01)
  *G06F 3/16* (2006.01)
  *G06F 3/0346* (2013.01)

(52) U.S. Cl.
  CPC .......... *G06F 3/04815* (2013.01); *G06F 3/167* (2013.01); *G06F 3/0346* (2013.01)

(58) Field of Classification Search
  USPC ........................................................ 715/767
  See application file for complete search history.

(56) References Cited

U.S. PATENT DOCUMENTS

| | | | |
|---|---|---|---|
| 2017/0308770 A1* | 10/2017 | Jetley | G06V 10/82 |
| 2018/0046851 A1 | 2/2018 | Kienzle et al. | |
| 2018/0191952 A1* | 7/2018 | Ardo | H04N 21/2662 |
| 2018/0288477 A1* | 10/2018 | Gupta | H04N 21/4532 |
| 2019/0138088 A1* | 5/2019 | Evans | H04N 13/106 |
| 2020/0097076 A1* | 3/2020 | Alcaide | G06F 3/013 |
| 2020/0202849 A1 | 6/2020 | Cartwright et al. | |

OTHER PUBLICATIONS

"International Search Report and Written Opinion Issued in PCT Application No. PCT/US22/013041", dated Apr. 22, 2022, 13 Pages.

* cited by examiner

INTENTION IMAGE ANALYSIS FOR DETERMINING USER FOCUS

BACKGROUND

A computing device may use different types of sensors to measure properties of a surrounding environment to detect natural user input. Natural user input allows for a user to interact with the computing device in manner that feels intuitive and parallel to real-world, non-virtual interaction, such as through gestures, expressions, movements, and/or speech. Non-liming examples of natural user input modalities include eye gaze, hand gestures, brain signal sensing, and voice, among others.

SUMMARY

A computer-implemented method for determining focus of a user is provided. User input is received. An intention image of a scene including a plurality of interactive objects is generated. The intention image includes pixels encoded with intention values determined based on the user input. An intention value indicates a likelihood that the user intends to focus on the pixel. An intention score is determined for each interactive object based on the intention values of pixels that correspond to the interactive object. An interactive object of the plurality of interactive objects is determined to be a focused object that has the user's focus based on the intention scores of the plurality of interactive objects.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
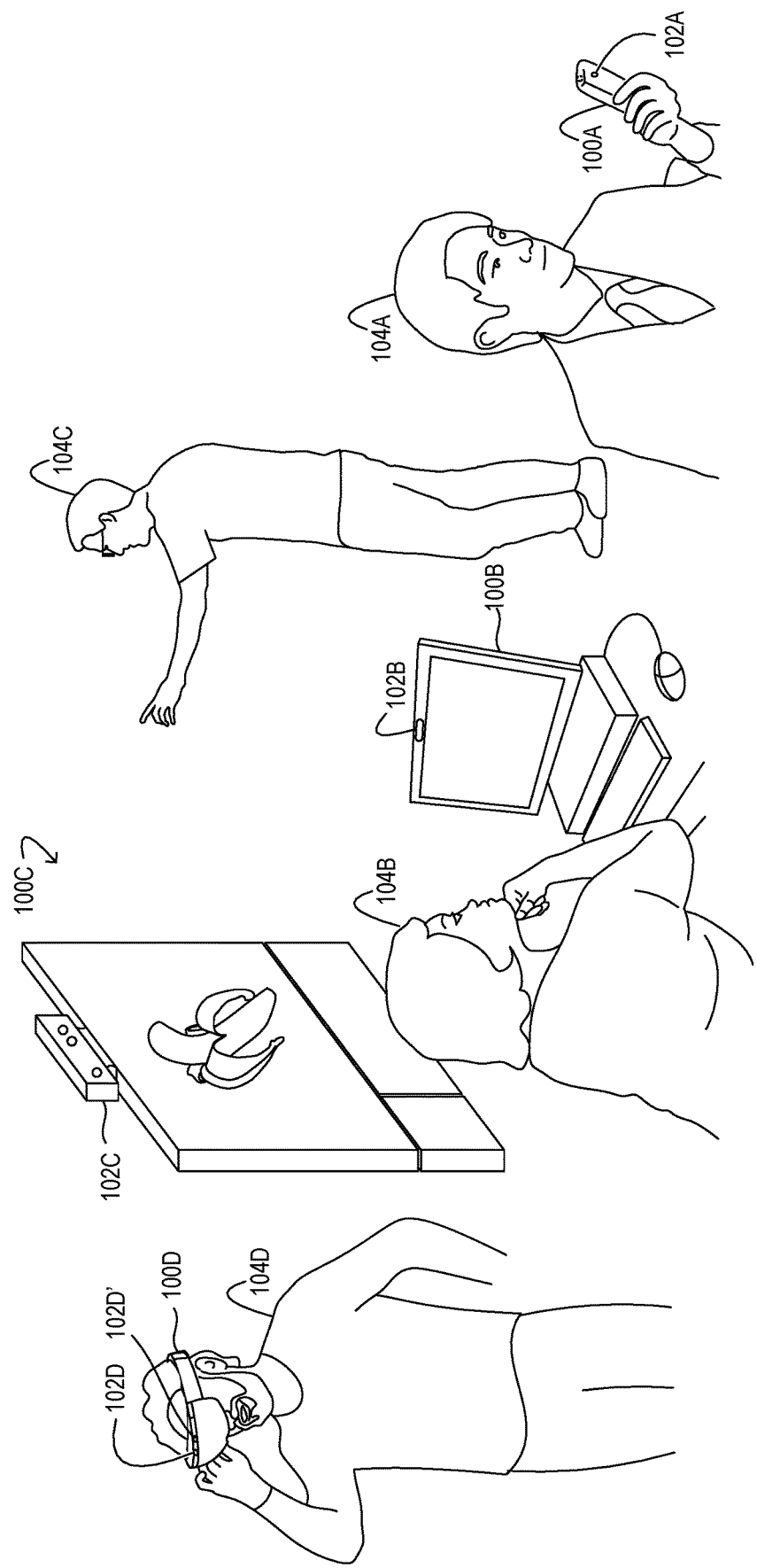
FIG. 1 shows different example electronic devices configured to receive natural user input.

Traditional computing architectures often assume that user input modalities are precise and certain. A keyboard/mouse, game controller, and touchpad are non-limiting examples of user input modalities that can provide relatively precise user input. To determine a user's focus (for example in relation to a displayed interactive object) based on input from such precise modalities, processing can rely on traditional ray-casting and/or hit-testing techniques. However, such ray-casting and hit-testing techniques do not account for the sensor noise and uncertainty that can be present with natural user input modalities, such as eye gaze, hand gesture, brain signal sensing, and voice, among others. Therefore, using ray casting and hit-testing techniques with such natural user input modalities can cause inaccuracies in determining user focus.

Accordingly, the present description presents an approach for determining a user's focus (e.g., in relation to a displayed interactive object) based on user input that leverages a computer's pre-existing systems for image rendering. In one example, the rendering system is used to generate an intention image of a scene including a plurality of interactive objects. The intention image includes pixels encoded with intention values determined based on user input of a user. An intention value indicates a likelihood that the user intends to focus on the pixel. An interactive object in the intention image "lights up" according to how likely it is that the interactive object has the user's focus. An intention score is determined for each interactive object based on the intention values of pixels that correspond to the interactive object. The "brightest" interactive object may be selected as being the subject of user focus based on its intention score relative to that of other interactive objects. Such an approach allows for user input to be treated not as precise points/positions, but rather as probabilistic spatial distributions of possible input positions. This allows for noisier, less precise user input, such as natural user input, to be used to provide accurate determinations of a user's focus.

Moreover, by turning the determination of the focused object into a rendering operation that uses the computer's rendering system, various features of that system can be advantageously leveraged. For example, multiple graphical processing units (GPUs) may be used in parallel to quickly render an intention image having interactive objects that are numerous and/or that have complex or irregular shapes. As another example, rendering system intention shaders may be programmed so that different interactive objects follow different rules in how they "light up" based on user input. For example, different rule sets may be associated with different "materials" that may be selected to render interactive objects. Further, such intention shader(s) may be programmable to allow for disambiguation of focus between multiple interactive objects by considering additional contextual information (e.g., prior user interaction with an interactive object, dwell time, etc.).

FIG. 1 shows aspects of four different examples of electronic devices (100A-D) that are configured to detect natural user input via natural user input componentry (102A-D). Device 100A is a smartphone that includes a camera 102A. The camera 102A may be configured to detect natural user input of a user 104A, such as eye gaze, hand gestures, and/or facial expressions. Device 100B is a personal computer that includes a camera 102B. The camera 102B may be configured to detect natural user input of a user 104B. Device 100C is a video game system that includes a peripheral camera 102C. The peripheral camera 102C may be configured to detect natural user input of a user 104C. Device 100D is a virtual-reality or augmented-reality headset that includes an outward-facing camera 102D and an inward-facing camera 102D'. The outward-facing camera 102D may be configured to detect natural user input of a user 104D, such as hand gestures. The inward-facing camera 102D' may be configured to detect natural user input of the user 104D, such as eye gaze. Additionally, any of the electronic devices 100A-100D optionally may include other sensors not shown in FIG. 1, such as a microphone to detect voice input of a corresponding user, an inertial measurement unit (IMU) to detect a position and/or motion of a corresponding electronic device, and/or other sensors. The electronic devices 100A-100D are provided as non-limiting examples that may be configured to perform the computer-implemented methods for determining a user's focus described herein. Generally, any suitable type of computer including any suitable sensors for detecting user input may be used to perform such methods.

Figure 2:
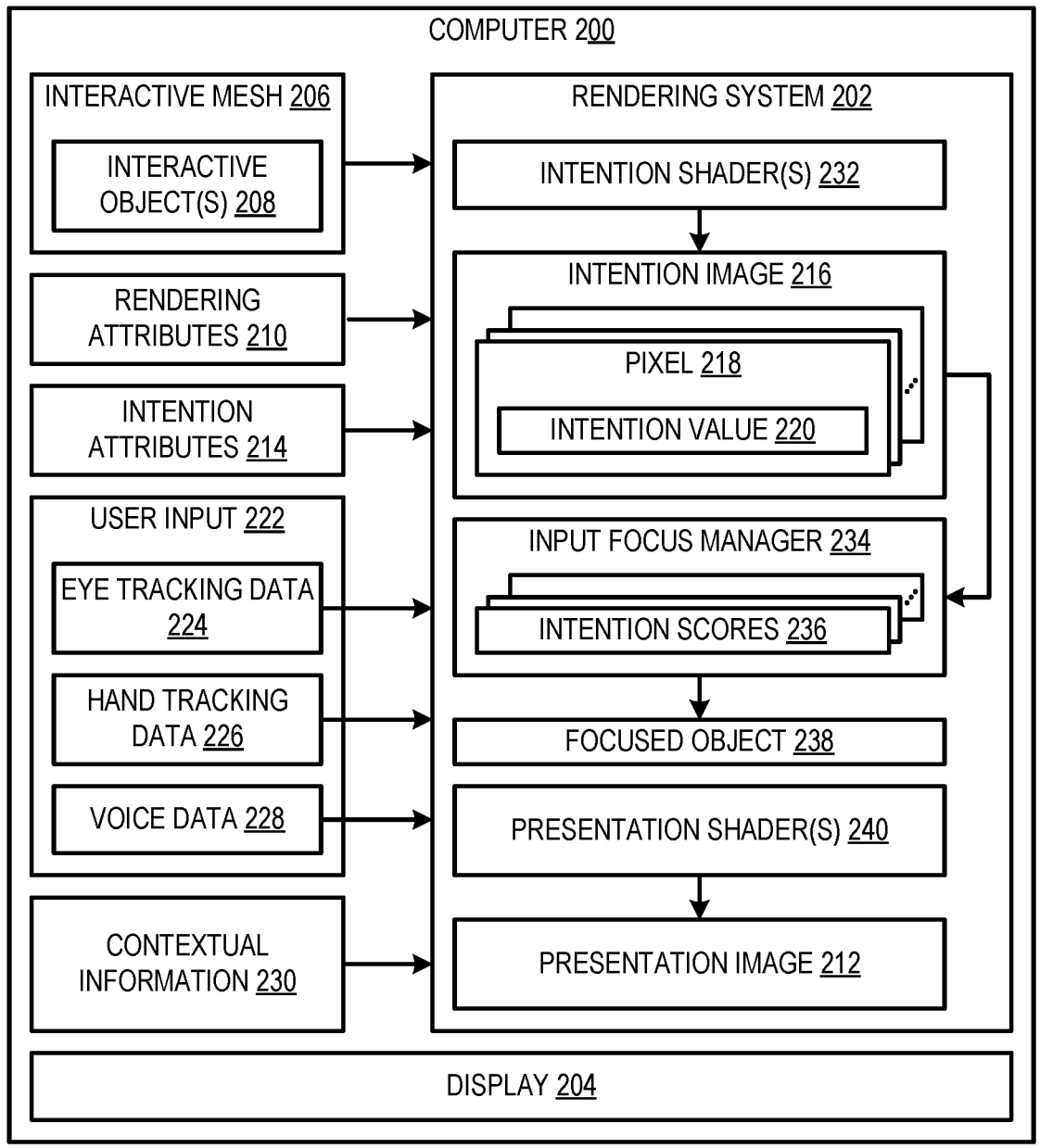
FIG. 2 schematically shows an example computer including a rendering system configured to determine a user's focus.

FIG. 2 schematically shows an example computer 200 including a rendering system 202. The rendering system 202 is configured to render presentation imagery to a display 204 based on an interactive mesh 206 representing a model of a virtual or augmented-reality scene. In some examples, the interactive mesh 206 may represent a three-dimensional (3D) model of the virtual or augmented-reality scene. In other examples, the interactive mesh 206 may represent a two-dimensional (2D) model of the virtual or augmented-reality scene. The interactive mesh 206 includes a plurality of interactive objects 208 in the scene. Interactive objects 208 are objects that a user may virtually interact with as part of a virtual-reality or augmented-reality experience. For virtual-reality implementations, an interactive object may be a virtual object in a virtual scene. For augmented-reality implementations, an interactive object may be a virtual object that is not actually present in the real-world scene viewed the user. In other examples, an interactive object may be a virtual object that models a real-world object in the viewed real-world scene. In such instances, the virtual object may be modeled without being displayed in presented imagery, and instead may be used to track the real-world object for purposes of augmented-reality user interaction. For example, the handle of a real-world door may be modeled in the interactive mesh, so that the computer can detect that the user interacts with the handle to open or close the door. Any suitable real-world object as well as any virtual object may be modeled in the interactive mesh 206. As described in detail below, the rendering system 202 is also configured to render intention imagery based on the interactive mesh 206, to determine user focus in relation to virtual objects.

The rendering system 202 may be configured to receive rendering attributes 210 for each of the interactive objects 208. The rendering attributes 210 characterize the appearance of the interactive objects 208 in a presentation image 212. For example, the rendering attributes 210 may include lighting information, such as position, direction, color, intensity, etc.; camera information, such as position, view, up, projection type, etc.; material/texture information, such as shininess, translucency, textures, etc.; and rendering information, such as resolution, post-effects, primitive count, etc.

Further, the rendering system 202 may be configured to receive intention attributes 214 for each of the interactive objects 208. The intention attributes 214 for an object define rules that the rendering system 202 uses to determine intention values 220 for the pixels corresponding to the object. An intention value 220 for a pixel 218 indicates a likelihood that the user intends to focus on it. The intention attributes 214 may define how user input 222 is interpreted to determine an intention value of a pixel corresponding to an object for which the attributes are specified. In some examples, the rules defined by the intention attributes 214 are associated with different materials that may be used to texture interactive objects 208. In one example, Ruleset R(matte) is associated with a matte-finish material for texturing interactive objects in the intention image, while a different Ruleset R(shiny) is associated with a shiny material for texturing interactive objects. In another example, a Ruleset R(eyes only) is a material that responds to the eye gaze vector and ignores other user input, such as hand positions, when determining intention values. In yet another example, a Ruleset R(hands only) is a material that responds to hand input and ignores other user input, such as eye input. Further, Ruleset R(righthand only) is a material that responds to right-hand input and ignores other user input, such as left-hand input and eye input. Further still, a Ruleset R(pinch only) is material that responds to hand positions if the user's hand pose is executing a pincer-grip gesture, but would not light up intention pixels if the user's hand assumed a different grasp or performed another gesture. By encoding different rule sets into different materials, the different rule sets may be easily applied to different interactive objects merely by assigning a selected material to a particular interactive object. Generally, any suitable ruleset may be encoded into a material and applied to any suitable interactive object.

The rendering system 202 may be configured to receive user input 222 from one or more different user input modalities. In some examples, such user input modalities may include natural user input (or inputs) detected by natural user input componentry. In some cases, the natural user input componentry may be integral with the computer 200. In others, the natural user input componentry may be peripheral to the computer 200. The user input 222 may include any suitable type of user input modality. In the illustrated implementation, the rendering system 202 is configured to receive eye tracking data 224, hand tracking data 226, and voice data 228.

The eye tracking data 224 may indicate eye position, eye movement relative to the head, and/or a gaze target at which the user is looking. In one example, the computer 200 may receive the eye tracking data 224 from one or more inward-facing cameras positioned to image a user's eye(s)—e.g., as incorporated within a head-mounted display.

The hand tracking data 226 may indicate position/orientation of a user's left hand and/or position/orientation of a user's right hand. In some instances, the hand tracking data 226 may further indicate hand gestures performed by the user's left and/or right hands. In one example, the computer 200 may receive the hand tracking data 226 from one or more outward-facing cameras (e.g., of a head-mounted display) positioned to image a real-world scene including the user's hand(s).

The voice data 228 may indicate voice input of a user. The voice data 228 may be processed/refined to any suitable degree for analysis of user intention. In some examples, the computer 200 may process the voice data 228 locally. In other examples, the computer 200 may send the voice data 228 to a remote computer (e.g., a cloud-based service) for processing.

The eye tracking data 224, the hand tracking data 226, and the voice data 228 are provided as non-limiting examples of user input 222 that may inform the rendering system 202 of a user's intention or focus. The rendering system 202 may be configured to determine a user's focus using any suitable user input modality and associated detection sensor/mechanism, including, in addition to eye tracking, etc., traditional mechanisms such as buttons, a keyboard, a pointing device, etc.

Optionally, in some implementations, the rendering system 202 may be configured to receive contextual information 230 to determine a user's focus. For example, contextual information may describe prior user interaction with an interactive object, prior intention values/probabilities from prior intention images, and/or predictions of future user intentions.

The rendering system 202 may take any suitable form. In one example, the rendering system 202 may be a graphical processing unit (GPU)-based rendering system. The GPU-based rendering system may allow for complex computations to be performed by graphics processing hardware to free up other resources (e.g., CPUs) of the computer 200 to perform other calculations. The GPU-based rendering system may be capable of performing hundreds of operations in parallel and may be specially designed for rendering images including complex objects quickly. The GPU-based rendering system is provided as an example and is meant to be non-limiting, as the rendering system 202 may take any suitable form.

The rendering system 202 includes one or more intention shaders 232 that are configured to generate the intention image 216. An intention shader 232 is a software program that is configured to instruct or inform how a pixel 218 of the intention image 216 is treated in terms of indicating user intent/focus based on user input 222 and optionally other factors such as contextual information 230. In particular, the intention shader 232 is configured to receive, for a given pixel, user input 222 and an interactive object identifier of an object to which the pixel corresponds in accordance with the interactive mesh 206. The shader may also receive rules (i.e., defined by the intention attributes 214) and context (i.e., defined by the contextual information 230) for the corresponding object. The intention shader 232 processes this information to generate the intention value 220 for the pixel. In some examples, the one or more intention shaders 232 may perform such processing on a pixel-by-pixel basis for each pixel of the intention image 216. In some examples, multiple intention shaders 232 may be configured to perform such processing for different pixels in parallel on multiple GPUs of the computer 200. In some examples, a different intention shader 232 may be assigned to each different interactive object 208, such that a particular intention shader assigns intention values to all pixels associated with a particular interactive object. In some such examples, the intention shader may assign the intention values based on a particular material (i.e., a particular set of rules) selected for the interactive object 208 in accordance with intention attributes 214, and optionally contextual information 230.

In some implementations, the intention image 216 may be a multi-channel image having a format similar to an RBG color image having red, blue, green, and alpha channels. For each pixel of the intention image, the rendering system may write an intention value to a first channel (e.g., the red channel) and write an interaction object identifier to a second channel (e.g., the blue channel). In scenarios where an interaction mesh includes a large number of interactive objects (e.g., more than 256), multiple channels may be used for the interactive object identifiers (e.g., blue channel and green channel). In some implementations, another channel (e.g., the alpha channel) optionally may be used to encode contextual information and/or an intention value derived from contextual information. Intention values, object identifiers, and any other relevant information used to determine a user's focus may be written to any suitable channel of an intention image 216.

Relative to ray tracing or hit testing, the intention shaders and intention images described herein allow for heightened customization and control in determining user input focus on virtual objects that may be targeted. Among other benefits, different user input modalities, custom rulesets, and contextual information may be employed in assessing user focus. Moreover, when applicable, the use of GPU-based rendering hardware can allow for interactive objects having complex shapes to be rendered in the intention image much faster than in a CPU-based approach for determining a user's focus.

In the depicted example, the rendering system 202 includes an input focus manager 234 configured to determine an intention score 236 for an interactive object 208 based the intention values 220 of pixels 218 that correspond to it. Typically, the input focus manager 234 determines an intention score 236 for each of the interactive objects 208 modeled in the interactive mesh 206. In one example, the input focus manager 234 determines an intention score 236 of an interactive object 208 by summing the intention values of pixels that correspond to the interactive object. In one example, the intention score 236 may be a raw sum of intention values 220 of pixels 218 that correspond to the interactive object 208. In another example, the input focus manager 234 determines an intention score 236 of an interactive object 208 by averaging the intention values of pixels that correspond to the interactive object. The input focus manager 234 may determine an intention score of an interactive object using any suitable calculation.

In some implementations, the input focus manager 234 optionally may be configured to normalize the intention scores for the plurality of interactive objects according to object size. For example, a relatively large interactive object with five hundred pixels might have fifty pixels with high intention values and the remaining pixels with low intention values. Further, a relatively smaller interactive object with one hundred pixels might have fifty pixels with high intention values and the remaining pixels with low intention values. In this example, the smaller interactive object has a higher normalized intention score than the larger interactive object, because the smaller interactive object has a higher average intention value per pixel than the large object. In this example, such normalization may provide a desired bias toward smaller objects. In another example, normalization of intention scores for interactive objects may include dividing a sum of all intention values by a number of non-zero intention pixels in the intention image. The input focus manager 234 may normalize the intention scores of the plurality of interactive objects in any suitable manner.

In some implementations, the input focus manager 234 optionally may be configured to smooth the intention scores 236 of the interactive objects based on intention scores sampled from multiple intention images generated over time. For example, such smoothing may make an interactive object appear to become "brighter" over time the longer that a user focuses on the interactive object. Intention scores may be sampled at any suitable rate over time and across any suitable number of intention images. Any suitable smoothing algorithm may be used to smooth the intention scores. Non-limiting examples of such smoothing algorithms include an infinite impulse response filter or a Kalman filter. Such smoothing may be performed to minimize the effect of sudden changes in user input akin to reducing flicker in an image. In some implementations, smoothing may be performed on a per pixel basis between two or more images. In some such examples, intention values of pixels from multiple images may be combined/smoothed using a linear combination. Intention values of pixels from multiple images may be combined using any suitable combination operation.

The input focus manager 234 may determine, from among multiple candidate virtual objects, that a particular object has the user's focus. Specifically, the input focus manager determines, in the present example, that focused object 238 has the user's focus based on the intention scores 236 of the interactive objects 208. In one example, the input focus manager 234 determines that an interactive object having a highest intention score of the intention scores of the plurality of interactive objects is the focused object 238.

In some implementations, the input focus manager 234 may be configured to determine that there is an ambiguity of focus based on intention scores of the interactive objects in the intention image, such that no single interactive object can initially be determined to be the focused object. In some instances, the input focus manager 234 may determine that no interactive object is a focused object based on such ambiguity or otherwise. For example, if no interactive object has an intention score above a minimum confidence threshold, then the input focus manager 234 may determine that no interactive object is a focused object. For example, the minimum confidence threshold may be set based on a sum of the intention scores of the interactive objects in the intention image, or via any other consideration/analysis of those intention scores. Further, confidence thresholds may vary from one intention image to another. If no intention score is greater than the minimum confidence threshold, that means that the user input is too ambiguous to identify a focused object.

In other instances, the input focus manager 234 may determine that there is an ambiguity of focus between two or more interactive objects. For example, if two or more interactive objects might have intention scores that are similar and greater than intention scores of all of the other interactive objects in the intention image, the input focus manager 234 may take additional action to determine the user's intention. In one example, the rendering system 202 may be configured to visually present, via the display 204, a disambiguation prompt to determine the user's intended focus target of the two or more interactive objects being disambiguated. Such a disambiguation prompt may include a zoom operation to enlarge the interactive objects having intention scores that are greater than the ambiguation threshold, so that the user can provide more precise user input in order to determine the focused object 238. Any suitable disambiguation prompt may be used to prompt a user to refine user input to determine an object of focus.

The rendering system 202 includes one or more presentation shader(s) 240 configured to render a presentation image 212 based on the interactive mesh 206 and the rendering attributes 210. The presentation image 212 includes the plurality of interactive objects 208 rendered as intended to be viewed based on the rendering attributes 210. The presentation image 212 may be output from the rendering system 202 to the display 204 for visual presentation to the user. Note that the intention image 216 differs from the presentation image 212 in that the intention image conveys intention values that indicate a likelihood that the user intends to focus on particular pixels. Generally, the intention image 216 is a data structure not intended for visual presentation via the display 204, though aspects of it may be visually presented in some scenarios, such as for calibration or to provide user feedback. In some implementations, the intention shaders(s) may be used to generate both intention images and presentation images.

The rendering system 202 may be configured to generate an intention image at any suitable frequency, for example in relation to the frame rate of the presentation image. In some examples, the rendering system 202 may be configured to generate an intention image for each presentation image, i.e., one-to-one correspondence. In other examples, the rendering system 202 may be configured to generate an intention image at a lower frequency, such as generating one intention image for every two, three, four, five or more presentation images.

In one example, the rendering system 202 may be configured to generate a presentation image 212 including the plurality of interactive objects 208 and output the presentation image 212 to the display for visual presentation to the user. Then, based on determining that an interactive object 208 is the focused object 238, the rendering system 202 may be configured to generate an updated presentation image in which a visual appearance of the interactive object 208 is changed relative to the prior presentation image to indicate that the interactive object 208 is the focused object 238. For example, when the interactive object becomes the focused object, the interactive object may be highlighted, change color, or change appearance in another way to differentiate from when the interactive object was not the focused object as well as the other interactive objects that do not have the user's focus.

FIGS. 3A, 3B, 3C, 3D, and 3E show different example scenarios where a user's intention to focus on one or more objects is determined based on natural user input during interaction with an augmented-reality experience. FIGS. 4A, 4B, and 4C show example intention images generate during such user interactions.

Figure 3A:
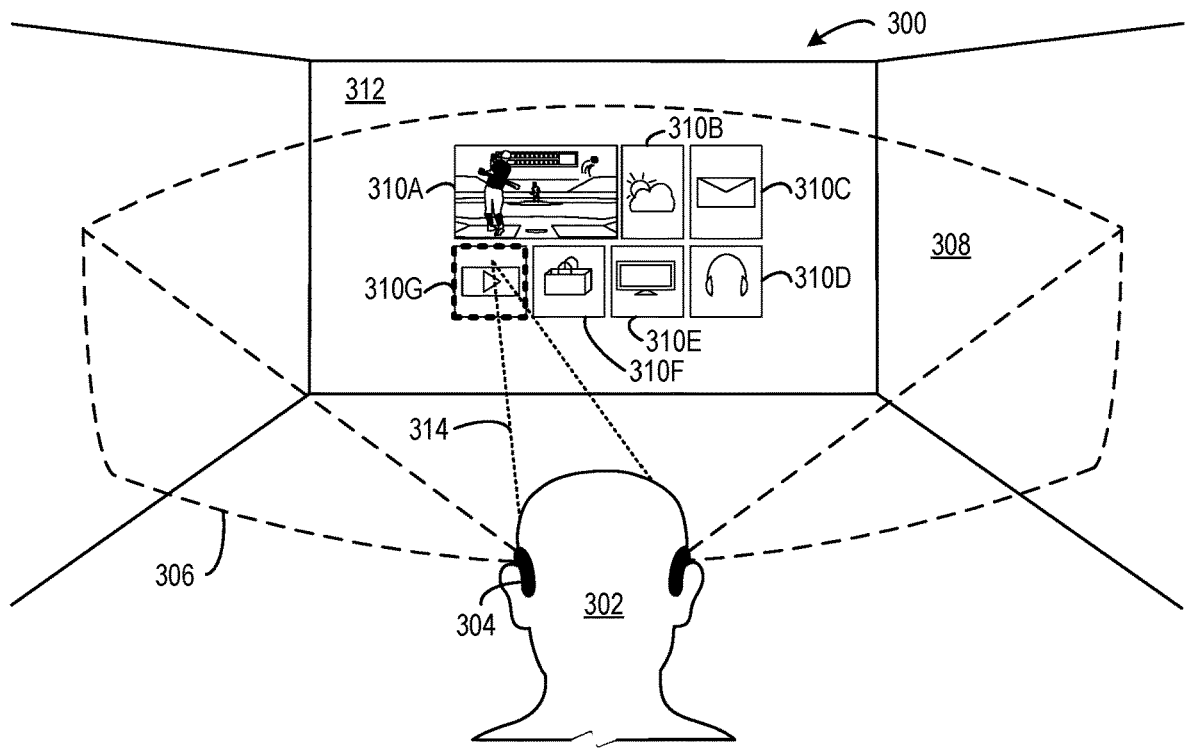
FIGS. 3A-3E show example scenarios in which an interactive object is determined to be a focused object having a user's focus.
Figure 4A:
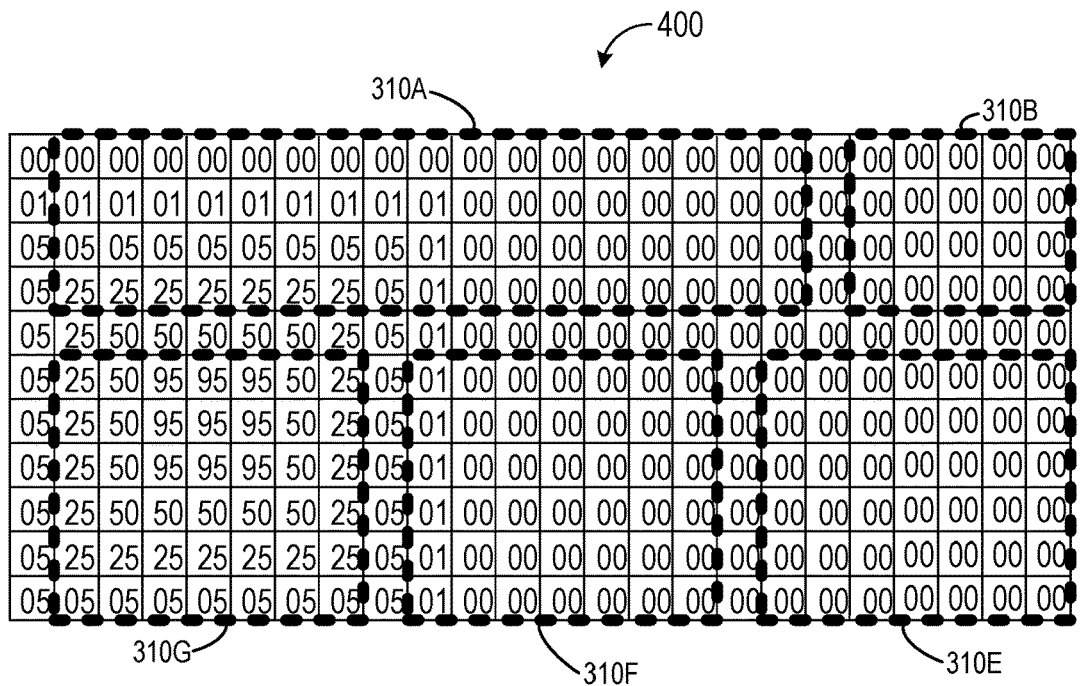
FIGS. 4A-4C show example portions of an intention image corresponding to the example scenarios of FIGS. 3A-3C.
Figure 4B:
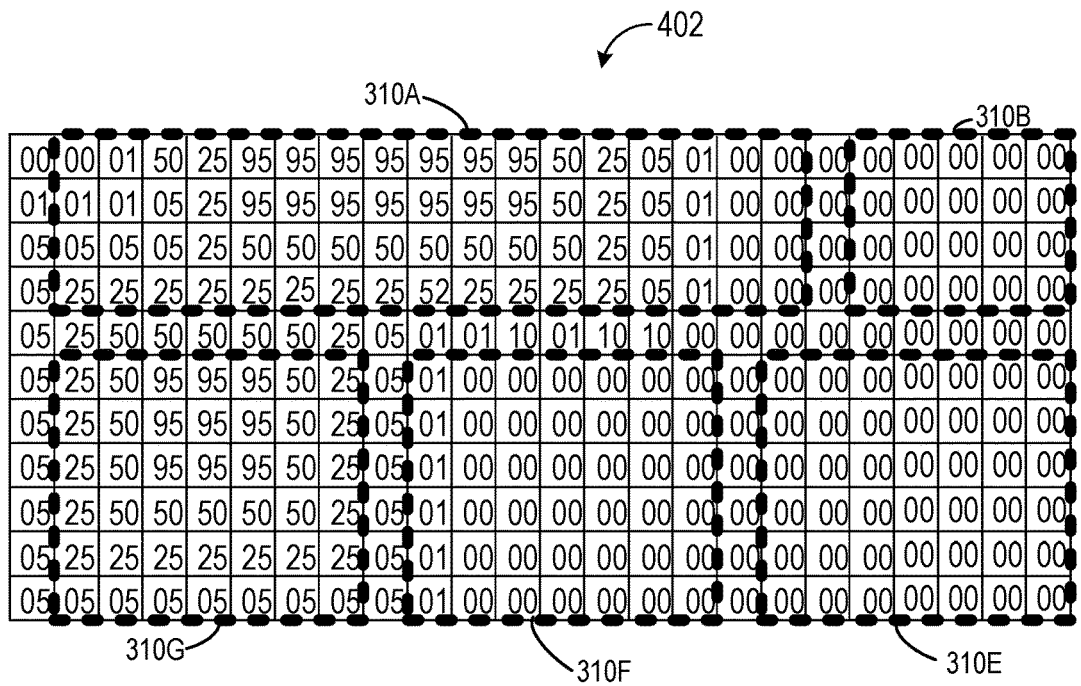
Figure 4C:
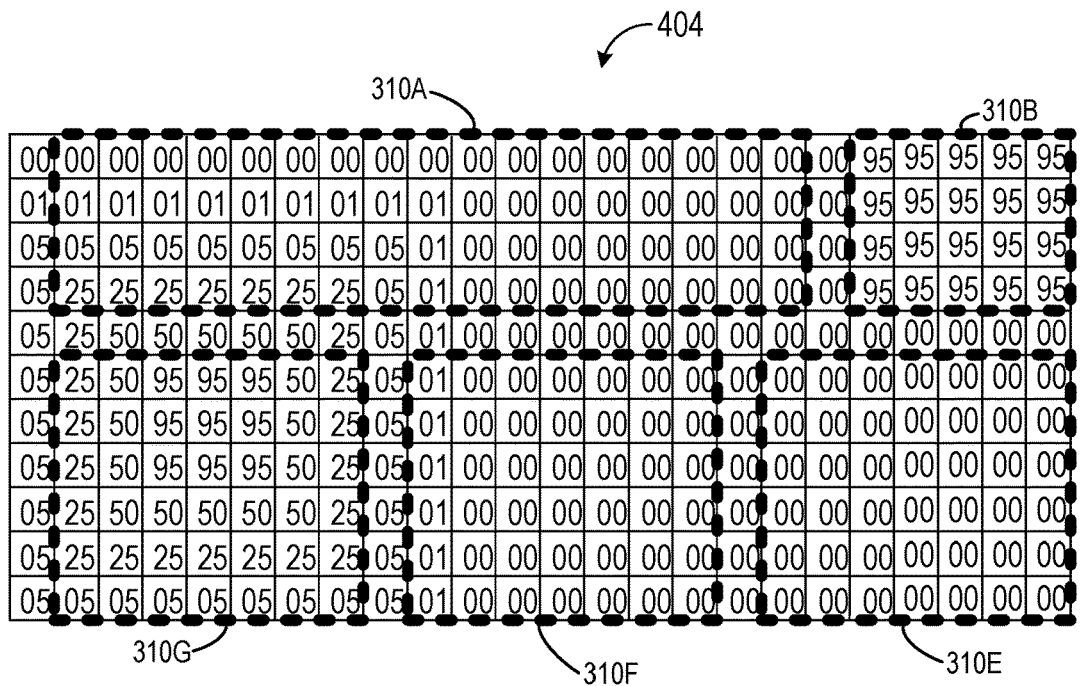

FIG. 3A shows a real-world scene 300 including a user 302 wearing a near-eye display device 304. The user 302 is viewing an augmented-reality experience through a field of view 306 of the near-eye display device 304. In particular, the near-eye display device 304 visually presents a presentation image 308 in the field of view 306. The presentation image 308 includes a plurality of interactive objects 310A-310F in the form of virtual slates that are presented to appear positioned on a real-world wall 312 of the real-world scene 300. The user 302 may select any one of the virtual slates using natural user input that is detected by sensors and/or other user input componentry of the near-eye display device 304. The near-eye display device 304 is configured to generate an intention image 400, a portion of which is shown in FIG. 4A, based on natural user input in the form of eye gaze tracking 314. The intention image includes interactive objects 310A, 310B, 310D, 310E, 310F, and 310G.

Each pixel of the intention image 400 is encoded with an intention value based on data from eye gaze tracking 314. Each intention value indicates a likelihood that the user intends to focus on respective pixel in the image. In this example shown in FIGS. 3A and 4A, as well as the other examples shown in FIGS. 3B, 3C, 3D, 4B, and 4C, the greater the intention value, the more likely the user 302 is focused on the pixel. For example, the intention values may be on a scale from 0-100 with intention values closer to 100 indicating a greater likelihood that the user is focusing on that pixel and intention values closer to 0 indicating a lesser likelihood that the user is focusing on the pixel. The illustrated intention values are meant to be arbitrary and non-limiting, and they may be represented in any suitable manner.

The near-eye display device 304 determines an intention score for each of interactive objects 310A-310G based on the intention values of pixels that correspond to the interactive object. The intention scores may be determined by applying summing, averaging or any other suitable operation to the intention values of pixels corresponding to the interactive objects. The intention scores of the interactive objects may be optionally normalized by object size, smoothed based on sampling of interactive scores from other intention images, and/or influenced by contextual information using the techniques described herein. In this example, interactive object 310G has the highest intention score and interactive object 310A has the next highest intention score. As such, the near-eye display device 304 determines that the interactive object 310G is the focused object that has the user's focus. Based on said determination, an appearance of the interactive object 310G may be changed in the presentation image 308 such that the interactive object 310G has a bold, highlighted border to provide visual feedback to the user 302 that the interactive object 310G is the focused object.

Figure 3B:
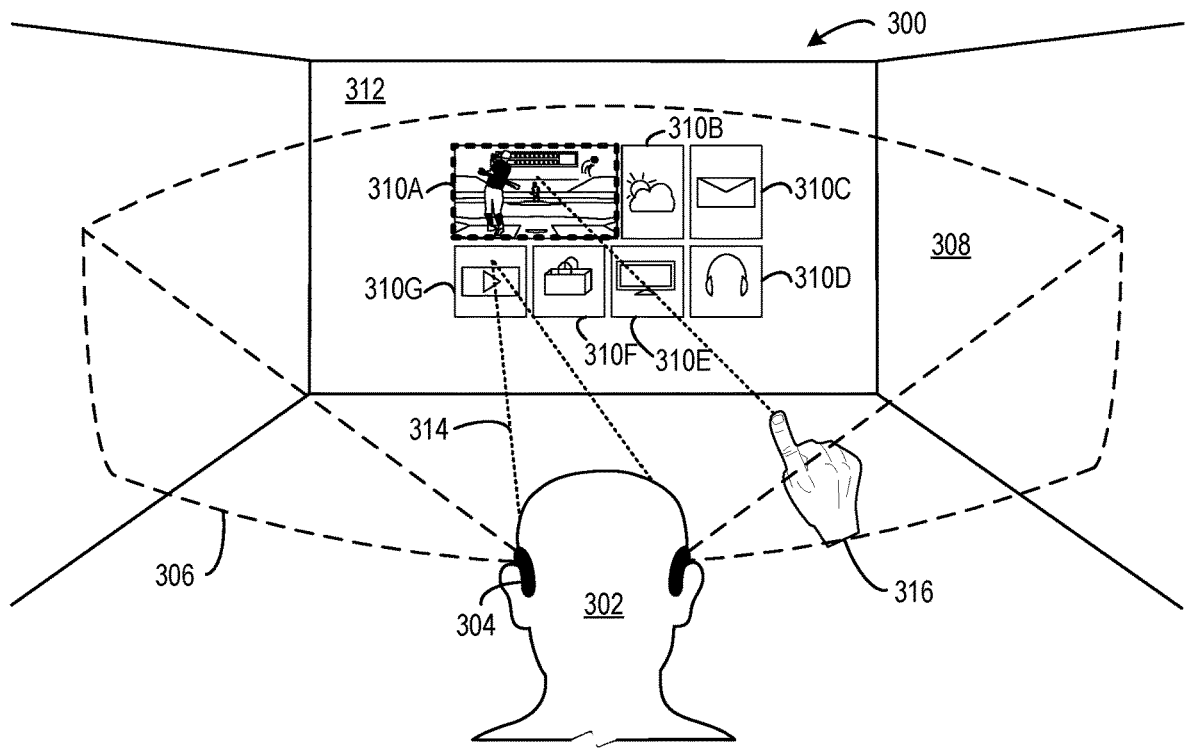

In FIG. 3B, the user 302 provides additional natural user input in the form of a position and orientation of a right hand 316, e.g., as detected by an outward-facing camera of near-eye display device 304. The near-eye display device 304 considers the contribution of the right hand 316 along with the eye gaze tracking 314 to determine the focused object. In this example, the right hand 316 is positioned and oriented to appear pointing at the interactive object 310A. This additional natural user input is reflected in an updated intention image 402 that is generated by the near-eye display device 304, a portion of which is shown in FIG. 4B. The updated intention image 402 includes interactive objects 310A, 310B, 310D, 310E, 310F, and 310G.

Each pixel of the updated intention image 400 is encoded with an intention value based on data from eye gaze tracking 314 and the position and orientation of the right hand 316. Each intention value indicates a likelihood that the user intends to focus on the corresponding pixel in the intention image 402. In this example, the greater the intention value, the more likely the user 302 is focused on that corresponding pixel. The near-eye display device 304 determines an intention score for each of interactive objects 310A-310G based the intention values of pixels that correspond to the interactive object in the intention image 402. In this example, the influence of the right-hand user input has caused the interactive object 310A to have the highest intention score and interactive object 310G to have the next highest intention score. As such, the near-eye display device 304 determines that the interactive object 310A is the focused object that has the user's focus. Based on said determination, an appearance of the interactive object 310A is changed in the presentation image 308 such that the interactive object has a bold, highlighted border to provide visual feedback to the user 302 that the interactive object 310A is the focused object.

Figure 3C:
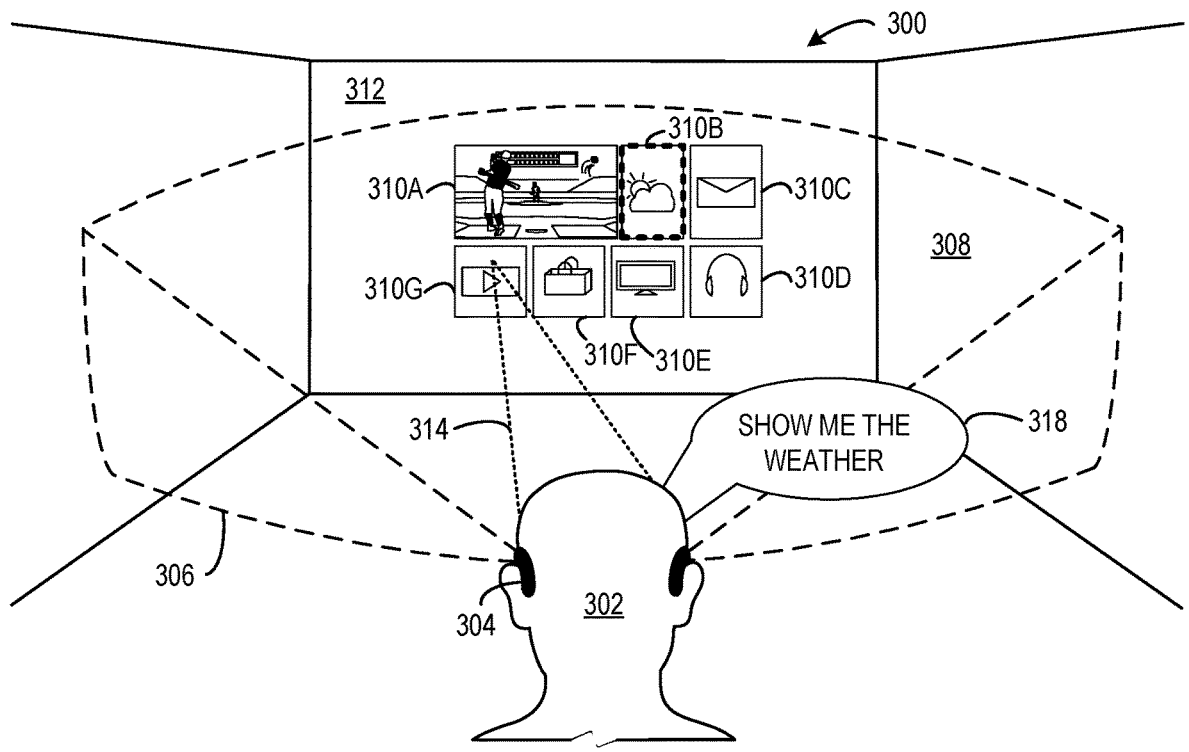

In FIG. 3C, the user 302 provides natural user input in the form of eye gaze tracking 314 directed toward interactive object 310G, e.g., as detected by an outward-facing camera of near-eye display device 304. Additionally, the user provides voice input 318, saying "SHOW ME THE WEATHER," e.g., as detected by a microphone of near-eye display device 304. This natural user input is reflected in an intention image 404 that is generated by the near-eye display device 304, a portion of which is shown in FIG. 4C. The intention image 404 includes interactive objects 310A, 310B, 310D, 310E, 310F, and 310G. Each pixel of the updated intention image 400 is encoded with an intention value based on data from eye gaze tracking 314 and the voice input 318. The near-eye display device 304 considers the contribution of the eye gaze tracking 314 along with the voice input 318 to determine the focused object. In this example, the contribution of voice input 318 results in the interactive object 310B having a higher intention score than the interactive object 310G, as 310B is associated with the weather. As such, the near-eye display device 304 determines that the interactive object 310B is the focused object that has the user's focus.

Note that the intention images 400, 402, 404 shown in FIGS. 4A, 4B, and 4C are provided as non-limiting examples. The intention images 400, 402, and 404 are shown in simplified form with a limited number of pixels being depicted for ease of understanding. In practice, an intention image may include any suitable number of pixels encoding any suitable intention values.

Figure 3D:
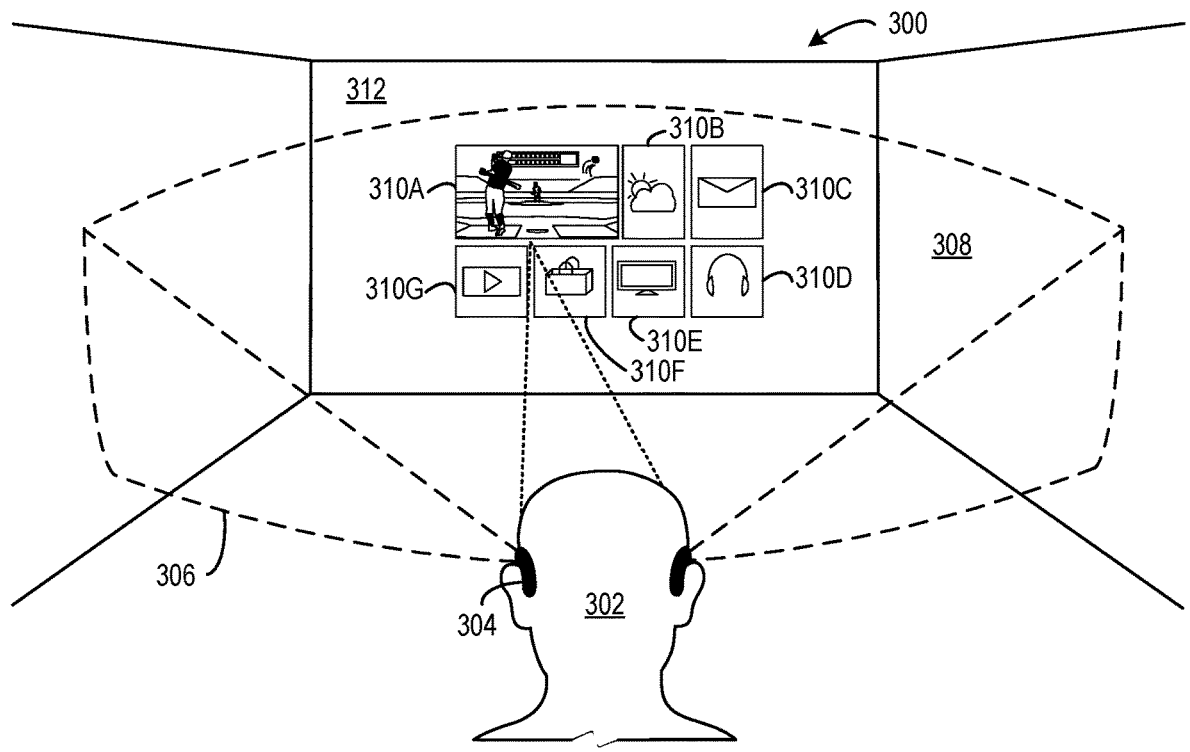

In FIG. 3D, the eye gaze tracking 314 of the user 302 results in multiple interactive objects 310A, 310F, and 310G having intention scores leading to ambiguity, such that the near-eye display device 304 cannot initially determine which interactive object is the focused object (i.e., determined eye gaze appears to be centered between the objects). As such, as shown in FIG. 3D, the near-eye display device 304 visually presents a disambiguation prompt 320 in which the view of the interactive objects 310A, 310F, and 310G is zoomed-in to determine the user's intended focus target of the three objects in question. Once the interactive objects 310A, 310F, and 310G are zoomed-in on, the user 302 provides voice input 322, saying "SHOW ME THE BASEBALL GAME," that explicitly selects the interactive object 310A. Based on said selection, an appearance of the interactive object 310A is changed in the presentation image such that the interactive object 310A has a bold, highlighted border to differentiate from the other interactive objects and provide visual feedback to the user 302 that the interactive object 310A is the focused object. In other examples, once the disambiguation prompt is provided, the near-eye display device 304 may re-evaluate the user input by generating an updated intention image and re-assessing the intention scores of the interactive objects to determine an object of focus.

Figure 5:
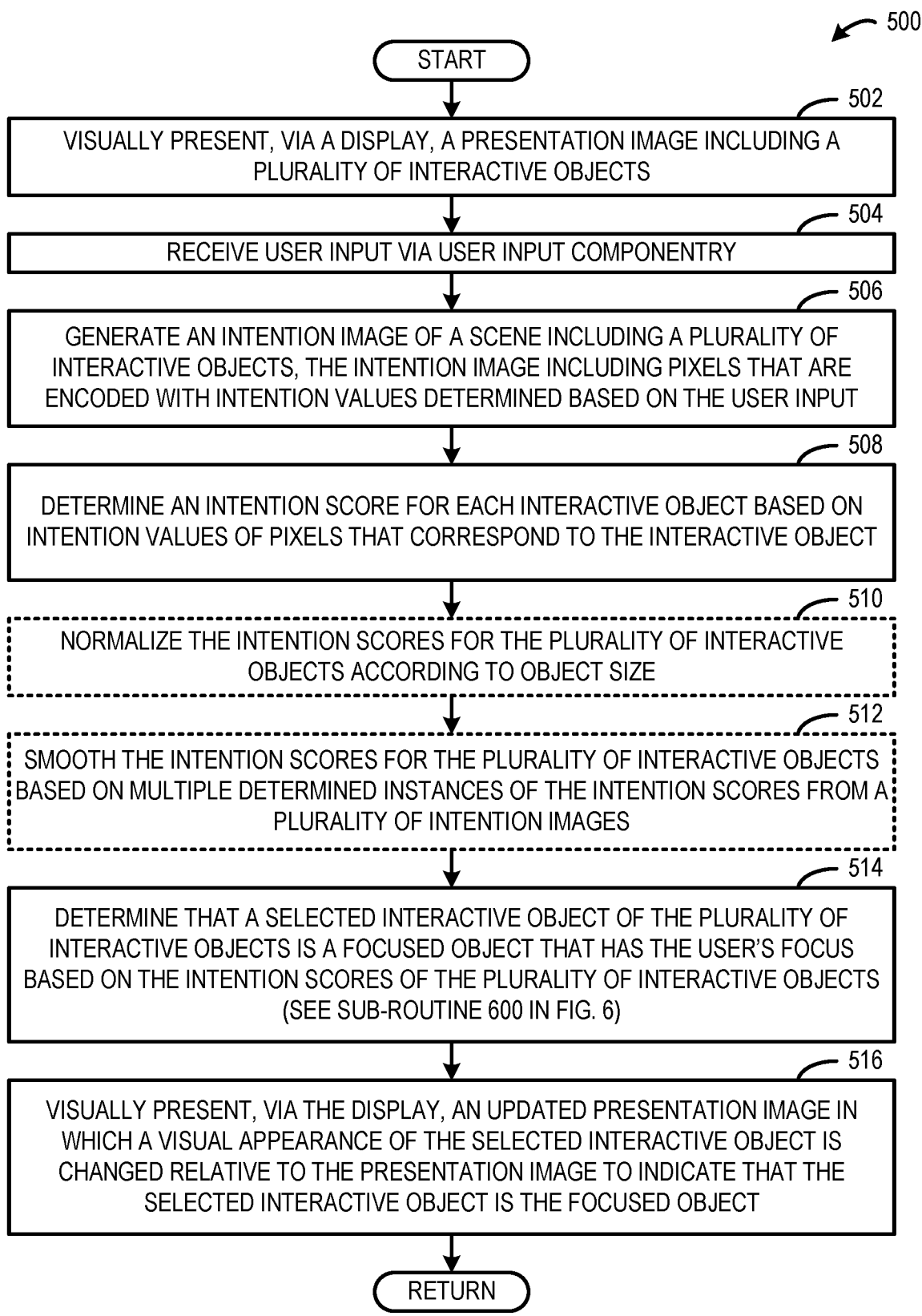
FIG. 5 is a flowchart showing aspects of an example computer-implemented method for determining a user's focus.

FIG. 5 shows an example computer-implemented method 500 for determining a user's focus in relation to multiple displayed interactive objects. For example, the method 500 may be performed by any of the electronic devices 100A-100D shown in FIG. 1, the computer 200 shown in FIG. 2, the near-eye display device 304 shown in FIGS. 3A-3E, the near-eye display system 700 shown in FIG. 7, the computing system 800 shown in FIG. 8, or generally any other type of computing system. At 502, the computer-implemented method 500 includes visually presenting, via a display, a presentation image including a plurality of interactive objects. At 504, method 500 includes receiving user input via user input componentry. At 506, the 500 includes generating an intention image of a scene including a plurality of interactive objects. The intention image includes pixels that are encoded with intention values determined based on the user input. An intention value indicates a likelihood that the user intends to focus on the pixel. In some examples, a rule set may be applied to an interactive object to determine intention values for pixels corresponding to the interactive object. In some examples, different rule sets may be applied to different interactive objects. In some examples, contextual information, such as prior user interaction with an interactive object, may be used to determine intention values for pixels corresponding to the interactive object. At 508, the computer-implemented method 500 includes determining an intention score for each interactive object based the intention values of pixels that correspond to the interactive object. In one example, an intention score for an object is determined by summing intention values of all pixels corresponding to the interactive object.

In some implementations, at 510, the computer-implemented method optionally may include normalizing the intention scores for the plurality of interactive objects according to object size, as discussed above with reference to FIG. 2. In some implementations, at 512, the computer-implemented method optionally may include smoothing the intention scores for the plurality of interactive objects based on a plurality of determined instances of the intention scores from a plurality of intention images, as also discussed above with reference to FIG. 2.

Figure 6:
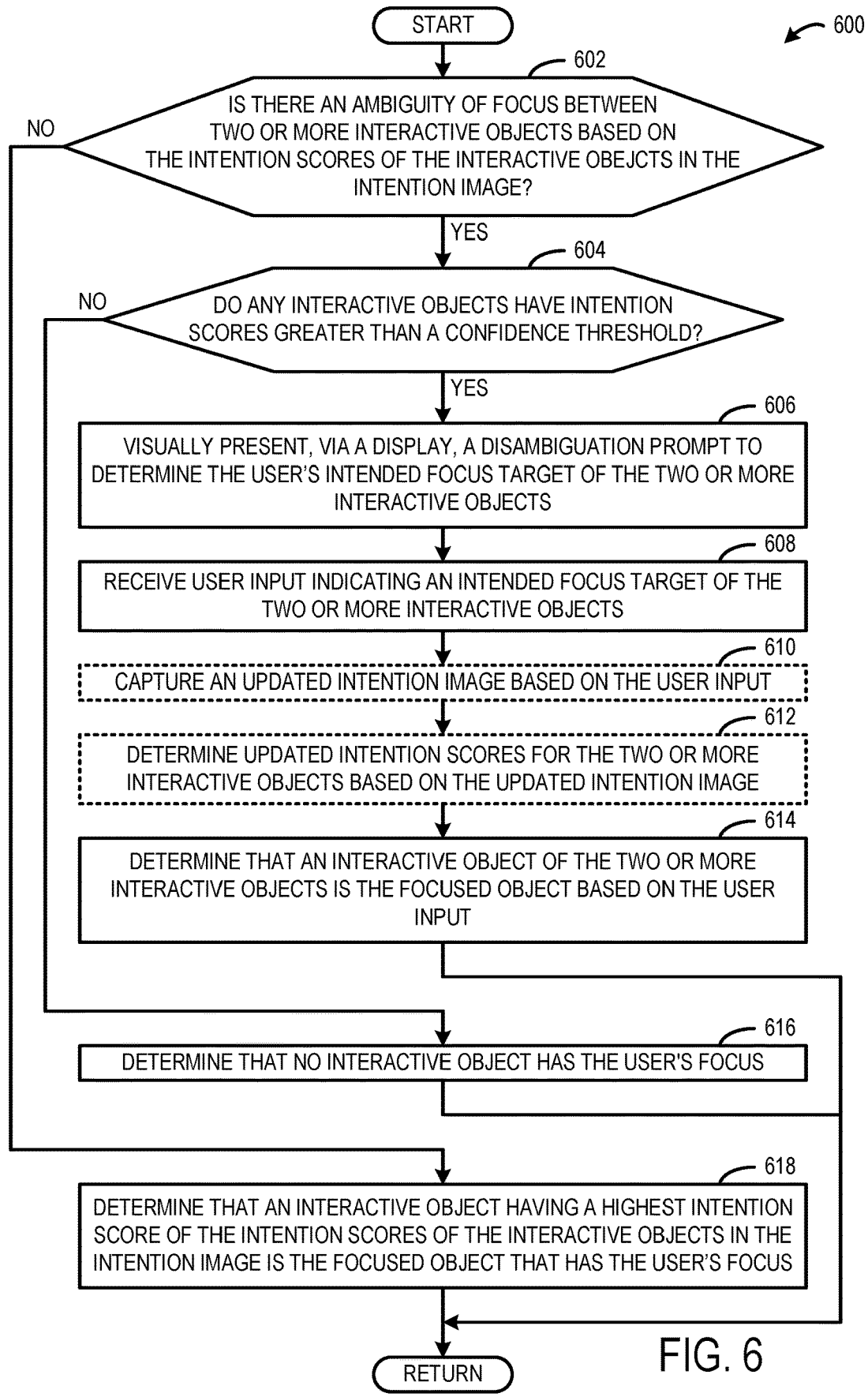
FIG. 6 is a flowchart of an example subroutine for determining that an interactive object is a focused object that has a user's focus.

At 514, the computer-implemented method 500 includes determining that an interactive object of the plurality of interactive objects is a focused object that has the user's focus, with that determination being based on the intention scores of the plurality of interactive objects. FIG. 6 shows an example subroutine 600 that may be performed to determine a focused object. In some implementations, the subroutine 600 optionally may be performed as part of the computer implemented method 500. At 602, the subroutine 600 includes determining if there is an ambiguity of focus between two or more interactive objects based on the intention scores of the interactive objects in the intention image. An ambiguity of focus means that no single interactive object can be determined to be a focused object based on comparing the intention scores of the interactive objects in the intention image. This can result from a "low signal" state in which most/all interactive objects have relatively low intention scores, or a state in which a particular subset of higher-scoring interactive objects are potential focus candidates that cannot be initially distinguished.

If there is an ambiguity of focus between two or more interactive objects, then the subroutine 600 moves to 604. Otherwise, the subroutine 600 moves to 618, at which point it is determined that there is no ambiguity and an interactive object having a highest intention score of the intention scores of the interactive objects in the intention image is the focused object that has the user's focus and the sub-routine 600 returns to other operations.

At 604, the subroutine 600 includes determining if any interactive object has an intention score greater than a minimum confidence threshold. If no interactive object has an intention score greater than the minimum confidence threshold (i.e., the above-mentioned "low signal" state), that means the user input and/or intention image is too ambiguous to identify any focused object. If any interactive object has an intention score greater than a minimum confidence threshold, then the subroutine 600 moves to 606. Otherwise, the subroutine 600 moves to 616, at which point it is determined that no interactive object has the user's focus and the sub-routine 600 returns to other operations.

Figure 3E:
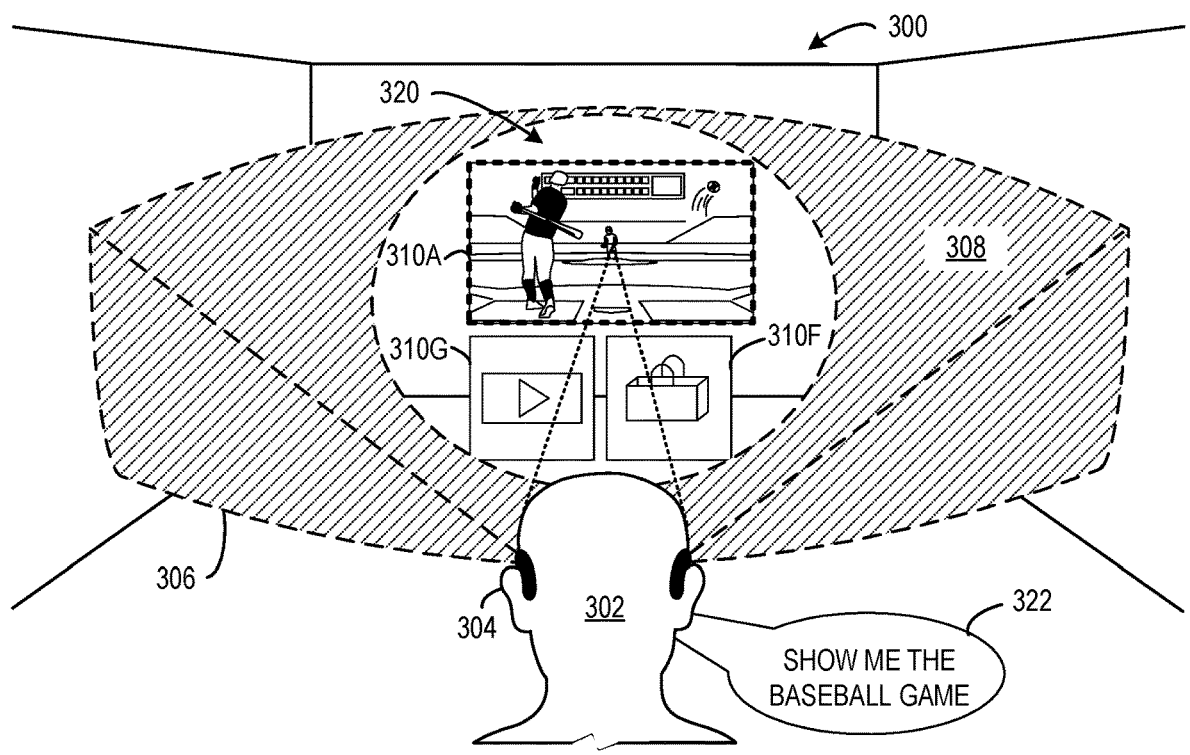

At 606, the subroutine 600 includes visually presenting, via the display, a disambiguation prompt to determine the user's intended focus target. A non-limiting example of such a disambiguation prompt is the zoomed-in disambiguation prompt 320 shown in FIG. 3E and discussed above. At 608, the subroutine 600 include receiving user input indicating an intended focus target of the above-threshold interactive objects. A non-limiting example of such a disambiguating user input is the voice input 322 is shown in FIG. 3E and discussed above. In some implementations, at 610, the subroutine 600 optionally may include generating an updated intention image based on the user input. In some implementations, at 612, the subroutine 600 optionally may include determining updated intention scores for the two or more interactive objects based on the updated intention image. At 614, the subroutine 600 includes determining that an interactive object of the two or more interactive objects is the focused object based on the user input. and the subroutine 600 returns to other operations. In some examples, the focused object may be determined based on the re-assessed intention score of the interactive objects in the updated intention image. In other examples, the focused object may be determined directly from the disambiguating user input without having to generate another interaction image and re-assess the intention scores of the interactive objects.

Returning to FIG. 5, at 516, the method 500 includes visually presenting, via the display, an updated presentation image in which a visual appearance of the selected interactive object is changed to indicate that it is the focused object and to distinguish it from the other interactive objects and the method returns to other operations.

The above-described method may be performed to allow for user input to be treated not as precise points, but rather as probabilistic distributions of possible input positions. This allows for noisier, less precise user input, such as natural user input, to be used to provide accurate determinations of a user's focus.

It will be understood that some of the steps described and/or illustrated herein may in some implementations be omitted without departing from the scope of this disclosure. Likewise, the indicated sequence of the steps may vary, and is provided for ease of illustration and description.

Figure 7:
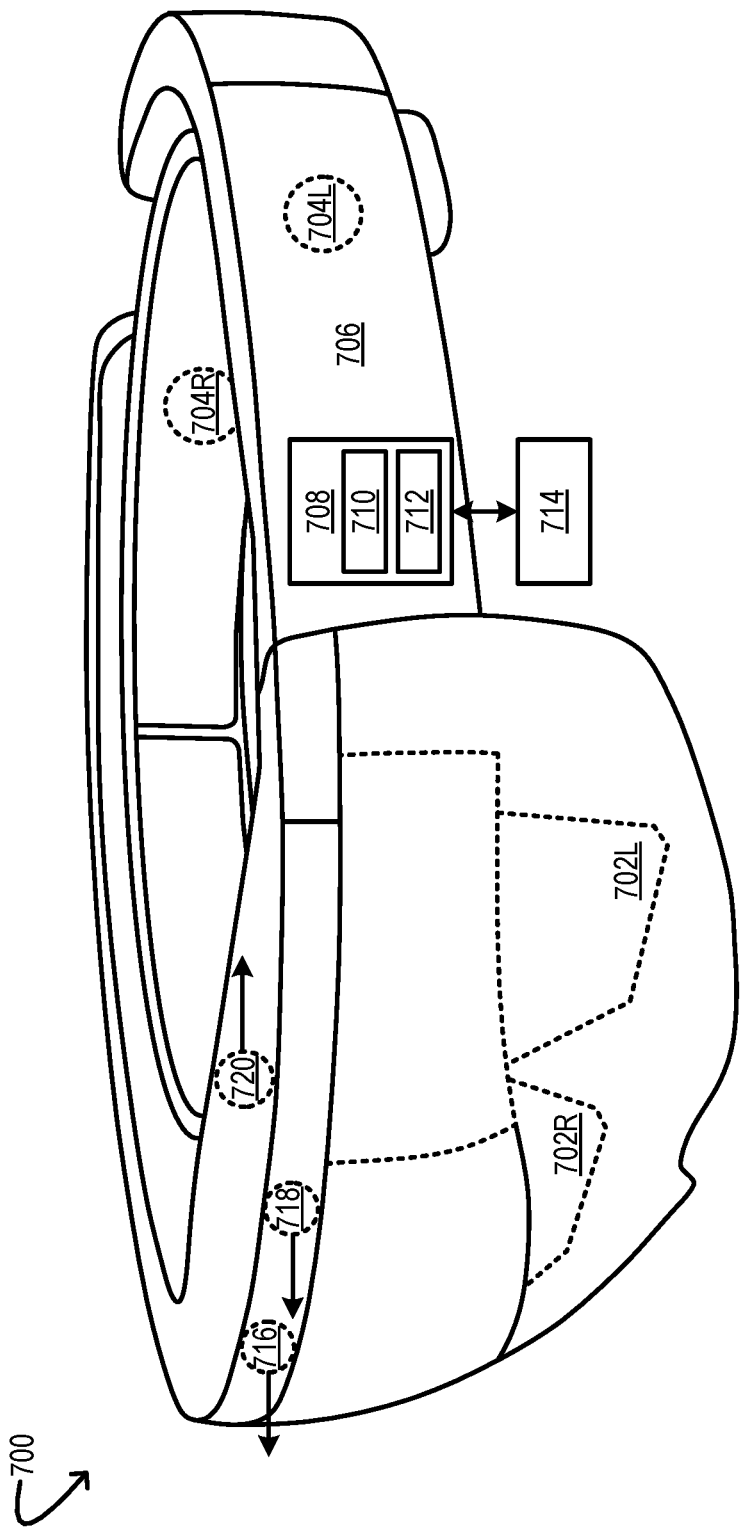
FIG. 7 shows an example near-eye display system.

FIG. 7 shows aspects of a near-eye display system 700 that may be configured to perform the herein-described intention image rendering approach to determine a user's focus. The near-eye display system 700 includes right and left display windows 702R and 702L, right and left over-the-ear loudspeakers 704R and 704L, and a frame 706 configured to rest on a wearer's head. Each of the right and left display windows includes display-projection componentry configured to project computerized display imagery into the wearer's field of view (FOV). In some implementations, the right and left display windows are wholly or partially transparent from the perspective of the wearer, to give the wearer a clear view of his or her surroundings for an augmented reality (AR) experience. In some implementations, the right and left display windows are opaque, such that the wearer is completely absorbed in the virtual-reality (VR) imagery provided via the display system, which optionally can be admixed with real imagery captured by a scene-facing camera. In some implementations, the opacity of the right and left display windows is controllable dynamically via a dimming filter. A substantially see-through display window, accordingly, may be switched to full opacity for a fully immersive mixed reality (MR) experience.

Near-eye display system 700 includes an on-board computer 708 and an on-board communication system 712. In some implementations, the on-board computer 708 is configured to render the computerized display imagery, which is provided to right and left display windows 702 as well as the and the intention imagery. In some implementations, such rendering is controlled, in whole or in part, by data received through the on-board communication system 712. In some implementations, such data may be transmitted by an off-board computer 714 via communication with the communication system 712. The off-board computer 714 may be a game console, desktop computer, or server system, for example. In other implementations, the off-board computer 714 may be a laptop or tablet computer, smartphone, handheld gaming device, etc. Display imagery or data controlling the rendering of display imagery and/or intention imagery may be communicated in any manner from the off-board computer 714 to on-board computer 708. Signal encoding such data may be carried over a wired or wireless communication link between communication systems of the respective computers. In some implementations, some or all of the functionality here ascribed to off-board computer 714 may be enacted instead in on-board computer 708.

When display system 710 is in operation, computer 708 sends appropriate control signals to right display window 702R that cause the right display window to form a right display image. Likewise, the computer sends appropriate control signals to left display window 702L that cause the left display window to form a left display image. The wearer of the display system views the right and left display images through right and left eyes, respectively. When the right and left display images are composed and presented in an appropriate manner, the wearer experiences the illusion of virtual imagery—i.e., one or more virtual objects at specified positions, and having specified 3D content and other display properties. Such virtual imagery may have any desired complexity; it may, for example, comprise a complete virtual scene having both foreground and background portions.

Near-eye display system 700 optionally may include a motion controller/a pose sensing system/position-sensing componentry 710 usable to determine the position and orientation of the display system in an appropriate frame of reference. In some examples, the position-sensing componentry returns a three degrees-of-freedom (3DOF) estimate of the three Cartesian coordinates of the display system. In some examples, the position-sensing componentry returns a six degrees-of-freedom (6DOF) estimate of the three Cartesian coordinates of the display system plus a rotation about each of the three Cartesian axes. To this end, the position-sensing componentry may include any, some, or each of an accelerometer, gyroscope, magnetometer, and global-positioning system (GPS) receiver. The output of the position-sensing componentry may be used to map the position, size, and orientation of virtual display objects (defined globally) onto the right and left display windows 702R, 702L of the near-eye display system. The pose-sensing componentry 710 may detect natural user input that may be used to determine a user's focus relative to interactive objects according to the methods described herein.

Near-eye display system 700 optionally may include a world-facing machine vision system comprising a color or monochrome flat-imaging camera 716 and a depth-imaging camera 718. The term 'camera' refers herein to any machine-vision component having at least one optical aperture and sensor array configured to image a scene or subject. The depth-imaging camera may be configured to acquire a time-resolved sequence of depth maps of a scene or subject. As used herein, the term 'depth map' refers to an array of pixels registered to corresponding regions ($X_i$, $Y_i$) of an imaged scene, with a depth value $Z_i$ indicating, for each pixel, the depth of the corresponding region. 'Depth' is defined as a coordinate parallel to the optical axis of the camera, which increases with increasing distance from the camera. Operationally, the depth-imaging camera may be configured to acquire 2D image data, from which a depth map is obtained via downstream processing. The term 'depth video' refers herein to a time-resolved sequence of depth maps.

In some implementations, discrete flat-imaging and depth-imaging cameras may be arranged with parallel optical axes oriented in the same direction. In some implementations, image or video output from the flat-imaging and depth-imaging cameras may be co-registered and combined into a unitary (e.g., RGB+depth) data structure or stream. In examples in which depth-imaging camera is a suitably configured time-of-flight (ToF) depth-imaging camera, a data stream representing both depth and brightness (e.g., IR+depth) may be available by combining outputs differing in phase.

In some implementations, an object-recognition engine is arranged downstream of the world-facing machine-vision system. Using image-identification algorithms, the object-recognition engine may be configured to compare objects resolved by the machine vision system to a plurality of objects stored in a database or defined heuristically, and to identify a match. For some objects, the object-recognition engine may identify a generic match (this object is a person) and/or a specific match (this object is a particular person associated with a particular computer identity).

Near-eye display system 700 optionally may include an eye tracker 720 configured to track a current position of a feature of an eye of the wearer. In some examples, the eye tracker 720 may be configured to independently track features in each of the wearer's eye. For example, the eye tracker 720 may include a light source that projects light onto the wearer's eye, and the eye tracker 720 may include an image sensor that captures light reflected from a cornea of the user's eye with which glints and/or other features can be identified to determine the position of the tracked feature. In some examples, the eye tracker 720 may be configured to determine a diameter and/or perimeter of a feature of the eye. The eye tracker 720 may be configured to determine the position of any suitable feature of the wearer's eye. Further, the eye tracker 720 may employ any suitable eye tracking technology.

No aspect of the foregoing description or drawings should be interpreted in a limiting sense, for numerous variants lie within the spirit and scope of this disclosure. For instance, although near-eye display system 700 of FIG. 7 is a near-eye display system in which the right display image appears behind a right display window, and the left display image appears behind a left display window, the right and left display images may also be formed on the same screen. In a stereo display system for a laptop computer, or home-theatre system, for example, the right display image may be formed on a display screen using light of one polarization state, and the left display image may be formed on the same display screen using light of different polarization state. Orthogonally aligned polarization filters in the user's eye-wear may be used to ensure that each display image is received in the appropriate eye.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 8:
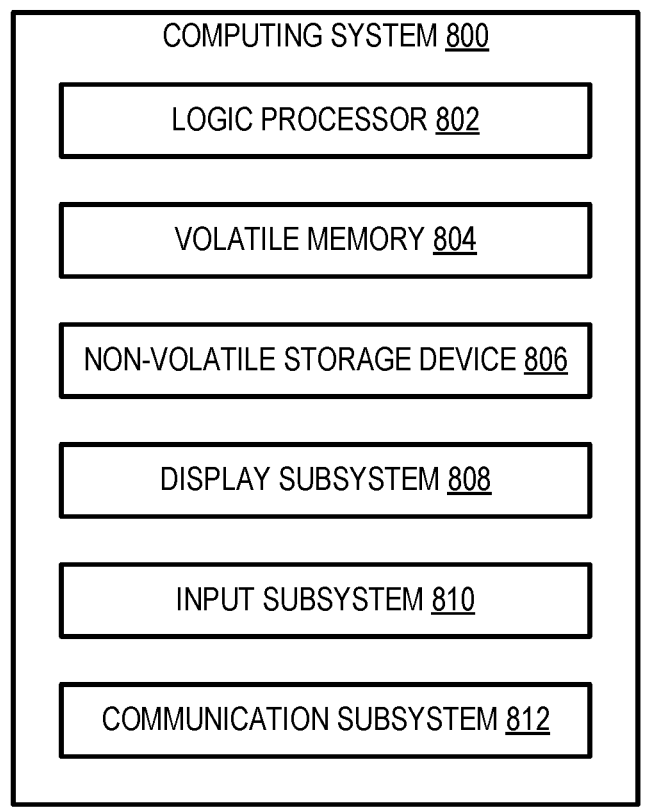
FIG. 8 shows an example computing system.

FIG. 8 schematically shows a non-limiting implementation of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices, and cameras, wearable computing devices such as smart wristwatches and head mounted augmented reality devices. For example, the computing system 800 may correspond to any of the electronic device 100A-100D shown in FIG. 1, the computer 200 shown in FIG. 2, the near-eye display device 304 shown in FIGS. 3A-3D, and the near-eye display system 700 shown in FIG. 7.

Computing system 800 includes a logic processor 802, volatile memory 804, and a non-volatile storage device 806. Computing system 800 may optionally include a display subsystem 808, input subsystem 810, communication subsystem 812, and/or other components not shown in FIG. 8.

Logic processor 802 includes one or more physical devices configured to execute instructions. For example, the logic processor 802 may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 802 may include one or more physical processors (hardware) configured to execute software instructions. Additionally or alternatively, the logic processor 802 may include one or more hardware logic circuits or firmware devices configured to execute hardware-implemented logic or firmware instructions. Processors of the logic processor 802 may be single-core or multi-core, and the instructions executed thereon may be configured for sequential, parallel, and/or distributed processing. Individual components of the logic processor 802 optionally may be distributed among two or more separate devices, which may be remotely located and/or configured for coordinated processing. Aspects of the logic processor 802 may be virtualized and executed by remotely accessible, networked computing devices configured in a cloud-computing configuration. In such a case, these virtualized aspects are run on different physical logic processors of various different machines, it will be understood.

Volatile memory 804 may include physical devices that include random access memory. Volatile memory 804 is typically utilized by logic processor 802 to temporarily store information during processing of software instructions. It will be appreciated that volatile memory 804 typically does not continue to store instructions when power is cut to the volatile memory 804.

Non-volatile storage device 806 includes one or more physical devices configured to hold instructions executable by the logic processor 802 to implement the methods and processes described herein. When such methods and processes are implemented, the state of non-volatile storage device 806 may be transformed—e.g., to hold different data.

Non-volatile storage device 806 may include physical devices that are removable and/or built-in. Non-volatile storage device 806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806.

Aspects of logic processor 802, volatile memory 804, and non-volatile storage device 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The logic processor 802, volatile memory 804, and non-volatile storage device 806 may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

The term "module" may be used to describe an aspect of computing system 800 typically implemented in software by a processor to perform a particular function using portions of volatile memory, which function involves transformative processing that specially configures the processor to perform the function. Thus, a module may be instantiated via logic processor 802 executing instructions held by non-volatile storage device 806, using portions of volatile memory 804. It will be understood that different modules may be instantiated from the same application, service, code block, object, library, routine, API, function, etc. Likewise, the same module may be instantiated by different applications, services, code blocks, objects, routines, APIs, functions, etc. The terms "module" may encompass individual or groups of executable files, data files, libraries, drivers, scripts, database records, etc.

When included, display subsystem 808 may be used to present a visual representation of data held by non-volatile storage device 806. This visual representation may take the form of a graphical user interface (GUI). Display subsystem 808 may include one or more display devices utilizing virtually any type of technology. In some implementations, display subsystem 808 may include one or more virtual-, augmented-, or mixed reality displays.

When included, input subsystem 810 may comprise or interface with one or more input devices. An input device may include a sensor device or a user input device. Examples of user input devices include a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 812 may be configured to communicatively couple computing system 800 with one or more other computing devices. Communication subsystem 812 may include wired and/or wireless communication devices compatible with one or more different communication protocols. The communication subsystem may be configured for communication via personal-, local- and/or wide-area networks.

In an example, a computer-implemented method for determining focus of a user, the method comprises receiving user input, generating an intention image of a scene including a plurality of interactive objects, the intention image including pixels that are encoded with intention values determined based on the user input, wherein an intention value indicates a likelihood that the user intends to focus on the pixel, determining an intention score for each interactive object based the intention values of pixels that correspond to the interactive object, and determining that an interactive object of the plurality of interactive objects is a focused object that has the user's focus based on the intention scores of the plurality of interactive objects. In this example and/or other examples, the user input may include a plurality of different user input modalities. In this example and/or other examples, the plurality of user input modalities may include two or more of eye position and rotation; left-hand position and rotation; right-hand position and rotation; voice input; a position of a mouse cursor; a position of one or more touch points on a touch screen; a three degree of freedom position of a motion controller; and a six degree of freedom position and orientation of a motion controller. In this example and/or other examples, the computer-implemented may further comprise normalizing the intention scores for the plurality of interactive objects according to object size. In this example and/or other examples, the computer-implemented method may further comprise smoothing the intention scores for the plurality of interactive objects based on a plurality of determined instances of the intention scores from a plurality of intention images. In this example and/or other examples, the intention score of each interactive object may be determined by summing the intention values of pixels that correspond to the interactive object, and wherein an interactive object having a highest intention score of the intention scores of the plurality of interactive objects may be determined to be the focused object that has the user's focus. In this example and/or other examples, the computer-implemented may further comprise visually presenting, via a display, a presentation image including the plurality of interactive objects, and based on determining that the interactive object is the focused object, visually presenting, via a display, an updated presentation image in which a visual appearance of the interactive object is changed relative to the presentation image to indicate that the interactive object is the focused object. In this example and/or other examples, the computer-implemented method may further comprise, determining an ambiguity of focus between two or more interactive objects based on intention scores of at least the two or more interactive objects, and based on said determining, visually presenting, via a display, a disambiguation prompt to determine the user's intended focus target of the two or more interactive objects. In this example and/or other examples, the intention values of the pixels of the intention image may be determined further based on contextual information including prior user interaction with an interactive object.

In another example, a computing system comprises a logic subsystem, and a storage subsystem holding instructions executable by the logic subsystem to receive user input via user input componentry, generate an intention image of a scene including a plurality of interactive objects, the intention image including pixels that are encoded with intention values determined based on the user input, wherein an intention value indicates a likelihood that the user intends to focus on the pixel, determine an intention score for each interactive object based on a sum of intention values of pixels that correspond to the interactive object, and determine that an interactive object of the plurality of interactive objects is a focused object that has the user's focus based on the intention scores of the plurality of interactive objects. In this example and/or other examples, the computing system may further comprise one or more intention shaders associated with the interactive objects and using different intention attributes for different interactive objects, wherein the intention attributes for an interactive object define rules for calculating the intention values of pixels corresponding to the interactive object based on the user input. In this example and/or other examples, the intention image may include a plurality of channels, and wherein the one or more intention shaders are configured to, for a pixel of the intention image, 1) encode the intention value into a first channel, and 2) encode an interactive object identifier of an interactive object to which the pixel corresponds into a second channel. In this example and/or other examples, the user input may include a plurality of different user input modalities. In this example and/or other examples, the plurality of user input modalities may include two or more of eye position and rotation; left-hand position and rotation; right-hand position and rotation; voice input; a position of a mouse cursor; a position of one or more touch points on a touch screen; a three degree of freedom position of a motion controller; and a six degree of freedom position and orientation of a motion controller. In this example and/or other examples, the storage subsystem may further hold instructions executable by the logic subsystem to normalize the intention scores for the plurality of interactive objects according to object size. In this example and/or other examples, the storage subsystem may further hold instructions executable by the logic subsystem to smooth the intention scores for the plurality of interactive objects based on a plurality of determined instances of the intention scores from a plurality of intention images. In this example and/or other examples, an interactive object having a highest interaction score of the intention scores of the plurality of interactive objects may be determined to be the focused object that has the user's focus. In this example and/or other examples, the storage subsystem may further hold instructions executable by the logic subsystem to visually present, via a display, a presentation image including the plurality of interactive objects, and based on determining that the interactive object is the focused object, visually present, via a display, an updated presentation image in which a visual appearance of the interactive object is changed relative to the presentation image to indicate that the interactive object is the focused object. In this example and/or other examples, the storage subsystem may further hold instructions executable by the logic subsystem to, determine an ambiguity of focus between two or more interactive objects based on intention scores of at least the two or more interactive objects, and based on said determining, visually present, via a display, a disambiguation prompt to determine the user's intended focus target of the two or more interactive objects.

In yet another example, a head-mounted display device comprises a near-eye display, natural user input componentry configured to detect natural user input of a user, a logic subsystem, a storage subsystem holding instructions executable by the logic subsystem to generate a presentation image of a scene including a plurality of interactive objects, visually present, via the near-eye display, the presentation image including the plurality of interactive objects, receive natural user input via the natural user input componentry, generate an intention image of the scene including the plurality of interactive objects, the intention image including pixels that are encoded with intention values determined based on the natural user input, wherein an intention value indicates a likelihood that the user intends to focus on the pixel, determine an intention score for each interactive object of the plurality of interactive objects based on the intention values of pixels that correspond to the interactive object, determine that an interactive object of the plurality of interactive objects is a focused object that has the user's focus based on the intention scores of the plurality of interactive objects, and based on determining that the interactive object is the focused object, visually present, via the near-eye display, an updated presentation image in which a visual appearance of the interactive object is changed relative to the presentation image to indicate that the interactive object is the focused object.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer-implemented method for determining focus of a user, the method comprising:
   visually presenting, via a display, a presentation image of a scene including a plurality of interactive objects;
   receiving user input from a plurality of user input modalities while the presentation image is being visually presented, via the display;
   generating an intention image of the scene including the plurality of interactive objects, the intention image including pixels that are encoded with intention values determined from the user input received from the plurality of user input modalities based on intention attributes of the plurality of interactive objects, wherein intention attributes for an interactive object define rules for calculating the intention values of pixels corresponding to the interactive object based on the user input from the plurality of user input modalities, wherein different interaction objects have different intention attributes that define different rules for how an intention value is calculated based on the user input, such that different rules produce different intention values for a same pixel based on the user input, and wherein an intention value indicates a likelihood that the user intends to focus on the pixel while the presentation image is being visually presented via the display;
   determining an intention score for each interactive object based the intention values of pixels that correspond to the interactive object;
   determining that an interactive object of the plurality of interactive objects is a focused object that has the user's focus based on the intention scores of the plurality of interactive objects;
   based on determining that the interactive object is the focused object, visually presenting, via the display, an updated presentation image changed relative to the presentation image to indicate that the interactive object is the focused object.

2. The computer-implemented method of claim 1, wherein the plurality of user input modalities includes two or more of eye position and rotation; left-hand position and rotation; right-hand position and rotation; voice input; a position of a mouse cursor; a position of one or more touch points on a touch screen; a three degree of freedom position of a motion controller; and a six degree of freedom position and orientation of a motion controller.

3. The computer-implemented method of claim 1, further comprising normalizing the intention scores for the plurality of interactive objects according to object size.

4. The computer-implemented method of claim 1, further comprising smoothing the intention scores for the plurality of interactive objects based on a plurality of determined instances of the intention scores from a plurality of intention images.

5. The computer-implemented method of claim 1, wherein the intention score of each interactive object is determined by summing the intention values of pixels that correspond to the interactive object, and wherein an interactive object having a highest intention score of the intention scores of the plurality of interactive objects is determined to be the focused object that has the user's focus.

6. The computer-implemented method of claim 1, wherein
   a visual appearance of the interactive object is changed in the updated presentation image relative to the presentation image to indicate that the interactive object is the focused object.

7. The computer-implemented method of claim 1, further comprising, determining an ambiguity of focus between two or more interactive objects based on intention scores of at least the two or more interactive objects, and based on said determining, visually presenting, via the display, a disambiguation prompt to determine the user's intended focus target of the two or more interactive objects.

8. The computer-implemented method of claim 1, wherein the intention values of the pixels of the intention image are determined further based on contextual information including prior user interaction with an interactive object.

9. A computing system comprising:
   a logic processor; and
   a storage device holding instructions executable by the logic processor to:
      visually present, via a display, a presentation image of a scene including a plurality of interactive objects;

receive user input from a plurality of user input modalities via user input componentry while the presentation image is being visually presented via the display;

generate an intention image of the scene including the plurality of interactive objects, the intention image including pixels that are encoded with intention values determined from the user input received from the plurality of user input modalities based on intention attributes of the plurality of interactive objects, wherein intention attributes for an interactive object define rules for calculating the intention values of pixels corresponding to the interactive object based on the user input from the plurality of user input modalities, wherein different interaction objects have different intention attributes that define different rules for how an intention value is calculated based on the user input, such that different rules produce different intention values for a same pixel based on the user input, and wherein an intention value indicates a likelihood that the user intends to focus on the pixel while the presentation image is being visually presented, via the display;

determine an intention score for each interactive object based on a sum of intention values of pixels that correspond to the interactive object;

determine that an interactive object of the plurality of interactive objects is a focused object that has the user's focus based on the intention scores of the plurality of interactive objects; and based on determining that the interactive object is the focused object, visually present, via the display, an updated presentation image changed relative to the presentation image to indicate that the interactive object is the focused object.

10. The computing system of claim 9, further comprising:
a plurality of intention shaders each associated with a different interactive object of the plurality of interactive objects, each of the plurality of intention shader being configured to determine intention values of pixels that correspond to an associated interactive object using intention attributes for the interactive object.

11. The computing system of claim 10, wherein the intention image includes a plurality of channels, and wherein each of the plurality of intention shaders is configured to, for a pixel of the intention image, 1) encode the intention value into a first channel, and 2) encode an interactive object identifier of an interactive object to which the pixel corresponds into a second channel.

12. The computing system of claim 9, wherein the plurality of user input modalities includes two or more of eye position and rotation; left-hand position and rotation; right-hand position and rotation; voice input; a position of a mouse cursor; a position of one or more touch points on a touch screen; a three degree of freedom position of a motion controller; and a six degree of freedom position and orientation of a motion controller.

13. The computing system of claim 9, wherein the storage device further holds instructions executable by the logic processor to normalize the intention scores for the plurality of interactive objects according to object size.

14. The computing system of claim 9, wherein the storage device further holds instructions executable by the logic processor to smooth the intention scores for the plurality of interactive objects based on a plurality of determined instances of the intention scores from a plurality of intention images.

15. The computing system of claim 9, wherein an interactive object having a highest interaction score of the intention scores of the plurality of interactive objects is determined to be the focused object that has the user's focus.

16. The computing system of claim 9, wherein
a visual appearance of the interactive object is changed in the updated presentation image relative to the presentation image to indicate that the interactive object is the focused object.

17. The computing system of claim 9, wherein the storage device further holds instructions executable by the logic processor to determine an ambiguity of focus between two or more interactive objects based on intention scores of at least the two or more interactive objects, and based on said determining, visually present, via the display, a disambiguation prompt to determine the user's intended focus target of the two or more interactive objects.

18. A head-mounted display device comprising:
a near-eye display;
natural user input componentry configured to detect natural user input of a user;
a logic processor;
a storage device holding instructions executable by the logic processor to:
generate a presentation image of a scene including a plurality of interactive objects;
visually present, via the near-eye display, the presentation image including the plurality of interactive objects;
receive natural user input from a plurality of user input modalities via the natural user input componentry while the presentation image is being visually presented via the near-eye display;
generate an intention image of the scene including the plurality of interactive objects, the intention image including pixels that are encoded with intention values determined from the natural user input received from the plurality of user input modalities based on intention attributes of the plurality of interactive objects, wherein intention attributes for an interactive object define rules for calculating the intention values of pixels corresponding to the interactive object based on the natural user input from the plurality of user input modalities, wherein different interaction objects have different intention attributes that define different rules for how an intention value is calculated based on the user input, such that different rules produce different intention values for a same pixel based on the user input, and wherein an intention value indicates a likelihood that the user intends to focus on the pixel while the presentation image is being visually presented, via the near-eye display;
determine an intention score for each interactive object of the plurality of interactive objects based on the intention values of pixels that correspond to the interactive object;
determine that an interactive object of the plurality of interactive objects is a focused object that has the user's focus based on the intention scores of the plurality of interactive objects; and
based on determining that the interactive object is the focused object, visually present, via the near-eye display, an updated presentation image in which a visual appearance of the interactive object is changed relative to the presentation image to indicate that the interactive object is the focused object.

* * * * *